United States Patent [19]
Cler

[11] Patent Number: 4,897,798
[45] Date of Patent: Jan. 30, 1990

[54] ADAPTIVE ENVIRONMENT CONTROL SYSTEM

[75] Inventor: Lawrence J. Cler, Broomfield, Colo.

[73] Assignees: American Telephone and Telegraph Company, New York, N.Y.; AT&T Information Systems Inc., Morristown, N.J.

[21] Appl. No.: 939,372

[22] Filed: Dec. 8, 1986

[51] Int. Cl.⁴ .......................... G06F 15/20; F23N 5/20
[52] U.S. Cl. ..................................... 364/505; 364/550; 364/557; 364/148; 374/11; 374/198; 236/46 R; 237/2 A; 165/14; 165/22
[58] Field of Search ............... 364/505, 506, 512, 550, 364/551, 148, 557; 374/11, 182, 189, 197, 198; 165/13, 14, 22, 26, 48 R; 236/46 R, 46 A; 237/2 R, 2 A

[56] References Cited

U.S. PATENT DOCUMENTS

| | | | |
|---|---|---|---|
| 4,172,555 | 10/1979 | Levine | 236/46 R |
| 4,205,381 | 5/1980 | Games et al. | 364/505 |
| 4,276,925 | 7/1981 | Palmeri | 364/505 |
| 4,298,943 | 11/1981 | Tompson et al. | 364/505 |
| 4,316,256 | 2/1982 | Hendricks et al. | 364/505 |
| 4,335,847 | 6/1982 | Levine | 364/505 |
| 4,449,178 | 5/1984 | Blau, Jr. et al. | 364/505 |
| 4,522,333 | 6/1985 | Blau, Jr. et al. | 364/505 |
| 4,644,478 | 2/1987 | Stephens et al. | 364/550 |
| 4,706,882 | 11/1987 | Barnard | 364/148 |
| 4,718,021 | 1/1988 | Timblin | 364/505 |

Primary Examiner—Parshotam S. Lall
Assistant Examiner—Brian M. Mattson
Attorney, Agent, or Firm—David Volejnicek

[57] ABSTRACT

This adaptive environment control system provides an HVAC control system that adapts to the continually-changing thermal characteristics of the building in which it operates. The adaptive environment control system periodically estimates the thermal characteristics of the building and uses these estimates to control the operation of the HVAC system. The adaptive environment control system also periodically measures the performance characteristics of the HVAC system to obtain data with which to update these thermal characteristic estimates. These thermal characteristic estimates enable the adaptive environment control system to determine both the length of time it takes the building to heat up and cool down when the HVAC system idles, as well as the amount of time it takes the HVAC system to heat or cool the building. These measurements and estimates are taken on a dynamic basis so that the adaptive environment control system responds to any changes in the environment, either within or without the building, including degradation of the operation of the HVAC system. The adaptive environment control system can calculate, through the estimates and measurements, the thermal performance of both the building and the HVAC system, so that the HVAC system is operational sufficiently early to maintain the building interior temperature within a predetermined range of the set-point threshold level of the thermostat.

46 Claims, 2 Drawing Sheets

ADAPTIVE ENVIRONMENT CONTROL SYSTEM

FIELD OF THE INVENTION

This invention relates to environment control systems and, in particular, to an adaptive environment control system that functions to customize the operation of the heating and air conditioning system in the building to the thermal characteristics unique to that particular building.

PROBLEM

Heating and air conditioning (HVAC) systems function to maintain the interior temperature of a building at a particular nominal or set point temperature. The control of the HVAC system is accomplished by the use of thermostats which sense the actual temperature in a particular building space. When the temperature deviates from the set point temperature by a predetermined amount, the thermostat activates the HVAC system to bring the building temperature back to the set point temperature.

Some thermostats also provide a set-back function which changes the building interior temperature to a predetermined set-back temperature during the hours when the building is unoccupied. These set-back thermostats operate on a time-of-day clock which enables the user to preprogram the thermostat for specific start and stop times during the day when the thermostat will operate with a set-back temperature setting.

The problem with existing thermostats and HVAC systems is that they all operate independently of the thermal characteristics of the building and exterior climatic conditions. These thermostats are preprogrammed simple mechanical devices which only sense the actual interior temperature of the building. Thermostats use this simple measurement to determine that the interior temperature of the building has deviated from the set-point temperature by a predetermined amount and the HVAC system must be activated to bring the building's interior temperature back to the set point level. The thermostats do not take into account: the speed with which the HVAC system can modify the building's interior temperature; outside weather conditions; and degradation of the performance of the HVAC system. Thus, the interior temperature of a building can cycle over a wider range of temperatures than is desirable, since the thermostat cannot account for these additional factors. These HVAC thermostat systems operate immutably, independently of the actual thermal characteristics of the building, and are simply a crude approximation of the environment control function.

SOLUTION

This problem is overcome and a technical advance is achieved by the adaptive enrironment control system of the present invention which provides an HVAC control system that adapts to the continually-changing thermal characteristics of the building in which it operates. The adaptive environment control system periodically estimates the thermal characteristics of the building and uses these estimates to control the operation of the HVAC system. The adaptive environment control system also periodically measures the performance characteristics of the HVAC system to obtain data with which to update these thermal characteristic estimates. These thermal characteristic estimates enable the adaptive environment control system to determine both the length of time it takes the building to heat up and cool down when the HVAC system idles, as well as the amount of time it takes the HVAC system to heat or cool the building.

These measurements and estimates are taken on a dynamic basis so that the adaptive environment control system responds to any changes in the environment, either within or without the building, including degradation of the operation of the HVAC system. The adaptive environment control system can calculate, through the estimates and measurements, the thermal performance of both the building and the HVAC system so that the HVAC system is operational sufficiently early to maintain the building's interior temperature within a predetermined range of the set-point threshold level of the thermostat. The adaptive environment control system can thereby accurately control the interior temperature of the building in spite of changing outside weather conditions and changes in the performance of the HVAC system.

In addition, the adaptive environment control system can accurately set the time at which the HVAC system is switched between the set-back unoccupied hours temperature level and the normal set-point building occupied temperature level, through the estimates of how long it takes both the HVAC system to have an impact on the building temperature as well as the rate of change of the interior building temperature based on outside environment conditions. These estimates and measurements of the adaptive environment control system provide a more efficient control of the HVAC system as well as an indication of the level of performance of the HVAC system for maintenance purposes.

DETAILED DESCRIPTION

Figure 1:
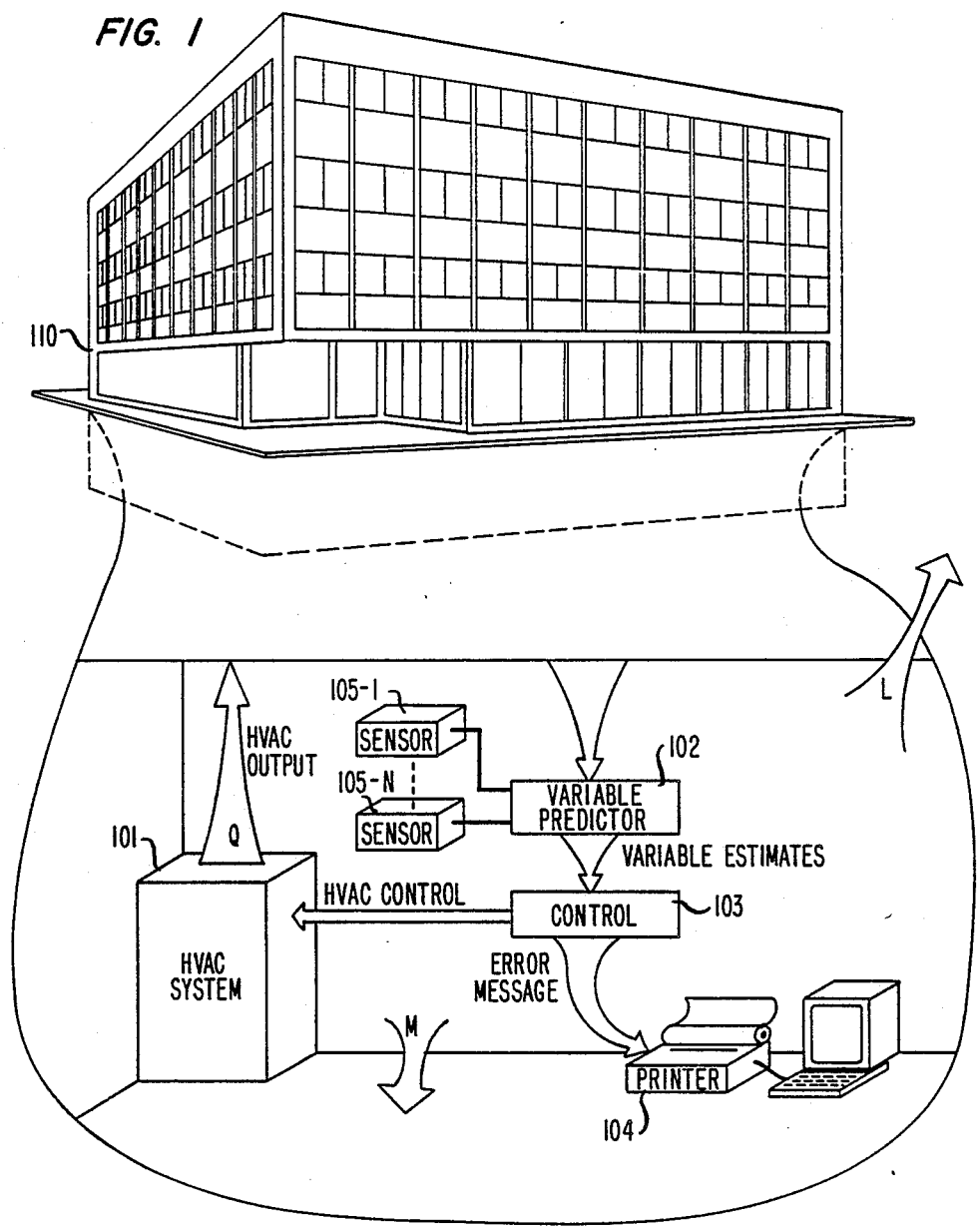
FIG. 1 illustrates the adaptive environment control system in block diagram form.

The adaptive environment control system of the present invention is illustrated in block diagram form in FIG. 1. This system is located in a building 110 and consists of a number of control elements 102 to 105-n in conjunction with the building heating, ventilation, and air conditioning (HVAC) system 101. The control elements consist of various sensor devices 105-1 to 105-n, such as thermostats and humidity sensors. Variable predictor 102 is connected to the various sensor devices 105-1 to 105-n to obtain measurements of the building environment. Variable predictor 102 provides output signals comprising estimates of the thermal characteristics of the building to control element 103. Control element 103 is a processor which uses the data provided by variable predictor 102 to control the operation of HVAC System 101 to thereby regulate the environment throughout building 110. Control element 103 also analyzes the data provided by variable predictor 102 to determine the operational efficiency of HVAC system 101. A terminal 104 is provided so that control element 103 can provide human-readable output to maintenance personnel in building 110 to indicate the operational status of HVAC System 101 as well as data indicative of the environment in building 110 throughout the course of the day. Terminal 104 also provides a user with a means to input data into the HVAC system, such as: times of building occupancy, setback temperature, occupied temperature, etc.

FIG. 1 also illustrates the thermal characteristic components associated with the operation of the subject adaptive environment control system. In a building such as 110, the building itself absorbs energy from the surrounding interior environment, and that is illustrated on FIG. 1 as element M which illustrates the thermal mass of the building. A second component in the thermal balance in building 110 is represented by arrow L which represents the thermal transfer through the exterior surfaces of the building to the surrounding environment. This thermal transfer L includes conductive transfer through the exterior surface of the building as well as thermal transfer provided by air infiltration in building 110. At the building wall/air interface, conductive transfer predominates, but convective and radiation transfers are also significant. The final component of the thermal balance in building 110 is represented by arrow Q, which is the thermal output of HVAC system 101. In operation, the HVAC system 101 provides a quantity Q of thermal energy to the building, which value Q represents the heat gain or loss M of the thermal mass of the building plus the thermal transfer L of the building to the surrounding environment. HVAC system 101 must provide sufficient thermal energy Q to offset the two thermal transfer elements M, L in order to maintain the interior temperature of the building at the set point temperature.

While the above discussion has mentioned only temperature, it is assumed for the purpose of this discussion that the humidity component of heating and cooling is also under the control of HVAC system 101. Thus the adaptive environment control system of the present invention is applicable for controlling the total environment, both temperature and humidity, of building 110.

THERMAL CHARACTERISTICS OF A BUILDING

The following description presents a mathematical analysis of the various thermal components Q, M, L that characterize the building environment. One component of the thermal balance is the time-rate-of-change of heat gain (or loss) of the thermal mass of the building:

$$M = \sum_{i}^{\text{all masses}} m_i c_i \frac{d}{dt} T_{in}(t) \tag{1}$$

where:
- i = a particular structural element of the building: the roof, an exterior wall, etc.
- $m_i$ = mass of building element i in kilograms
- $c_i$ = specific heat of building element i in kiloJoules per kilogram-°C. This is the number of kiloJoules required to raise one kilogram of the mass $m_i$ one degree Centigrade
- $T_{in}(t)$ = temperature in degrees Centigrade inside the building as a function of time
- t = time.

Another component of the thermal balance is the composite rate of heat transfer of the building to the surrounding environment:

$$L = \sum_{i}^{\text{all surfaces}} U_i A_i [T_{i,in}(t) - T_{i,out}(t)] \tag{2}$$

where:
- i = a particular exterior surface of the building
- $U_i$ = thermal conductivity of surface i in kiloJoules per square meter °C. second. This is the number of kiloJoules that is transmitted through a square meter of surface i per second of time and per degree of Centigrade temperature difference between the inside and outside temperature.
- $A_i$ = surface area of surface i in square meters
- $T_{i,in}(t)$ = temperature in degrees Centigrade inside the building at surface i as a function of time
- $T_{i,out}(t)$ = temperature in degress Centigrade outside of the building at surface i as a function of time.

The final component of the thermal balance is Q which equals the thermal input to the building provided by the HVAC equipment.

THERMAL BALANCE

In this building environment, it is assumed for the purpose of this description that the adaptive environment control system is set to maintain the interior temperature of the building within a predetermined temperature range around a fixed set-point temperature. The following equation represents the energy balance of the building environment where the time-rate-of-change of heat gain or loss of the thermal mass of the building must be equal to the rate of heat transferred to the building by the HVAC system less the composite rate of heat transfer of the building to the surrounding environment:

$$M = Q - L \tag{3}$$

or $$\sum_{i}^{\text{all masses}} m_i c_i \frac{d}{dt} T_{in}(t) = \tag{4}$$

$$Q - \sum_{i}^{\text{all surfaces}} U_i A_i [T_{i,in}(t) - T_{i,out}(t)]$$

rearranging this equation yields $$d T_{in}(t) = dt \frac{Q}{\sum_{i}^{\text{all masses}} m_i c_i} - \tag{5}$$

$$\frac{\sum_{i}^{\text{all surfaces}} U_i A_i [T_{i,in}(t) - T_{i,out}(t)]}{\sum_{i}^{\text{all masses}} m_i c_i}$$

let $$\gamma = \frac{Q}{\sum_{i}^{\text{all surfaces}} U_i A_i}$$

If we assume, for the sake of simplicity, that $T_{i,in}(t) - T_{i,out}(t)$ is the same for all surfaces, then $T_{i,in}(t) - T_{i,out}(t) = t_{in}(t) - T_{out}(t)$ and the surface summation can be considered a fixed constant.

let $$k = \frac{\sum_{i}^{\text{all surfaces}} U_i A_i}{\sum_{i}^{\text{all masses}} m_i c_i} \tag{6}$$

then $$d[T_{in}(t)] = dt\{k\gamma - k[T_{in}(t) - T_{out}(t)]\} \quad (7)$$

Thus, we have an equation describing the interior temperature of the building as a function of time. This equation can be solved directly, but a simplified solution is presented for descriptive purposes. To obtain a simplified solution of this equation, substitute the first two terms of the Taylor series expansion of the exponential function for $T_{in}(t)$ with the initial condition $$T_{in}(t) = T_o \text{ at } t = 0:$$

$$T_{in}(t) \cdot T_o + kt(T_{out}(t) + \gamma - T_o) \quad (8)$$

This yields:

$$k = \frac{T_{in}(t) - T_o}{t(T_{out}(t) - T_o)} \quad (9)$$

and $$\gamma = T_o - T_{out}(t) - \frac{T_o - T_{in}(t)}{kt} \quad (10)$$

Thus, by determining a reasonable estimate of the parameters k and γ, an approximation of the temperature in the building at time t in the future is determinable. A particular application of this capability is the above-mentioned optimal start/stop capability. For this application, the amount of time for the building temperature to cycle to the set point/back temperature is:

$$t = \frac{T_{set} - T_{in}(t)}{k(T_{out}(t) + \gamma - T_{in}(t))} \quad (11)$$

For short time intervals, $T_{out}(t)$ is approximately a constant and the equation is reduced in complexity. In addition, for the case of the unoccupied building with the HVAC system off, γ=0 since Q=0.

VARIABLE PREDICTION

Figure 2:
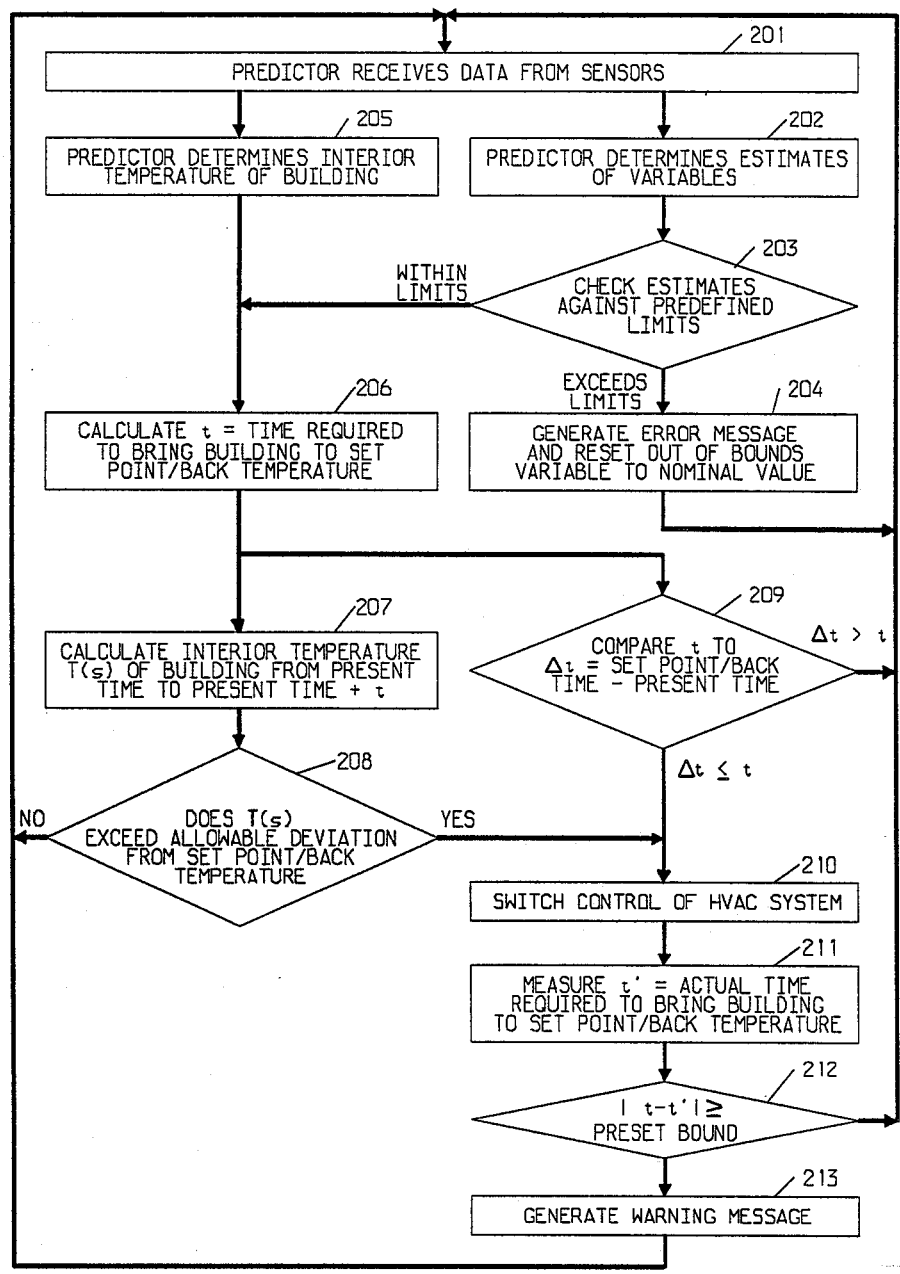
FIG. 2 illustrates in flow diagram form the operation of the adaptive environment control system.

FIG. 2 illustrates in flow diagram form the operation of the adaptive environment control system and, in particular, the optimal start/stop capability. Since the HVAC system 101, and the control system 102 to 105-n which regulates its operation, are typically operational 24 hours a day, the flow diagram on FIG. 2 is illustrated as a closed-loop control system. A logical place to begin this discussion of FIG. 2 is at step 201, where variable predictor 102 receives data from sensors 105-1 to 105-n. This data may be in analog or digital signal form, and is indicative of the temperature/humidity conditions in various parts of building 110. Variable predictor 102, at step 205, uses this data obtained from sensors 105-1 to 105-n to determine the interior temperature of building 110. Variable predictor 102, at step 202, also uses this data to determine estimates of the variables, which variables were discussed above as indicators of the thermal characteristics of building 110. The variables discussed above are k and γ, which variable predictor 102 generates as a result of the measurements taken by sensors 105. Variable predictor 102 in step 202 generates signals indicative of k and γ for building 110 at this particular moment in time. The variables are passed to control element 103 which, at step 203, checks the estimates transmitted by variable predictor 102 against pre-defined limits which are programmed into control element 103. If these estimates exceed the pre-defined limits, control element 103 proceeds to step 202 and generates an error message which is printed on terminal 104 to alert the building maintenance personnel that the thermal characteristics of the building as estimated by variable predictor 102 do not match the pre-defined limits pre-programmed into control element 103. Such a disparity is indicative of either a failure of the HVAC system 101 or a problem in the operation of variable predictor 102. In either case, the building maintenance personnel must be notified to quickly remedy the problem.

In order to continue the operation of HVAC system 101, control element 103 resets the variables to a nominal value within the pre-defined limits programmed into control element 103. Control element 103 then passes control to variable predictor 102, which takes the new values of the variables now set by control element 103 and uses this information in conjunction with the signals transmitted by sensors 105-1 to 105-n to predict new estimates of the variables k and γ.

OPTIMAL START/STOP OPERATION

Control element 103 proceeds from step 203 to 206 when the variable estimates generated by variable predictor 102 are within the pre-defined limits set in control element 103. When the variables are within limits, control element 103, at step 206, calculates the time required to bring the building to the set-point/back temperature as defined by the user. Control element 103 then branches into two parallel processing operations. A first operation determines whether the set-point/back time has been reached, while the second operation determines whether the building interior temperature has deviated from the set-point/back temperature by an amount greater than a predetermined threshold. The first operation begins with control element 103 comparing, in step 209, the present time to the time programmed in control element 103 for the set-point/back operation to take place. The difference between the present time and the set-point/back time is then compared by control element 103 to the time required to bring the building to the set-point/back temperature. The control element 103, in step 209, determines whether the present time is sufficiently close to the time at which the operation of HVAC system 101 is to be switched to the alternate mode to discontinue the normal control operation of the HVAC system 101. An example of this is the set-back temperature operation where the building temperature is reduced during the evening hours. The HVAC system 101 continues to condition the interior temperature of building 110 during the course of the day. This conditioning is to maintain the building temperature at the set point temperature. When the present time becomes sufficiently close to the set back time, the adaptive environment control system determines that there is sufficient thermal inertia in building 110 such that the operation of HVAC system 101 can be curtailed and the temperature in building 110 will drop due to normal thermal transfer L and be such that the temperature in building 110 will reach the set-back temperature at exactly the set-back time defined in control element 103 by the user. In prior systems, the HVAC system 101 would continue to operate to condition the temperature of building 110 to the set-point temperature all the way up to the set-back time. The present adaptive environment control system allows the HVAC system 101 to be shut down a significant time in advance of the set-back time because the adaptive environment control system calculates the amount of time for the temperature in building 110 to slowly change to reach the set-back temperature from the present set-point temperature. The efficiency of HVAC system 101 is thereby enhanced due to the fact that, at the set-point and set-back time, HVAC system 101 is controlled in accordance with the actual thermal characteristics of the building 110. If the present time is not close to set-point/back time, control element 103 returns to step 201 to continue normal control operation of HVAC system 101.

TRANSFER TO SET-BACK OPERATION

When control element 103 determines that the present time is sufficiently close to the set-point/back time that the operation of HVAC system 101 must transition to either the set-point or set-back operation, control element 103 proceeds to step 210. At step 210, control element 103 revises the control procedure in operation for HVAC system 101. For the set-back condition, control element 103 disables HVAC system 101 so that the temperature in building 110 will change due to thermal transfer L to the temperature defined as the set-back temperature. At the set-point time, control element 103 will change the control setting of the set point temperature so that control element 103 activates HVAC system 101 to a higher level of activity so that temperature in building 110 is brought to the set-point temperature rather then the set-back temperature. In the set-back case, the adaptive environment control system has calculated, at step 206, the amount of time it takes for the interior temperature of building 110 to reach the set-back temperature. At step 211, control element 103 measures the actual time that it takes for the building to reach the set-back temperature. At step 212, control element 103 compares the estimated time required to bring the building to the set-back temperature against the time actually required and compares this difference to a preset bound. If the building has taken a significant amount of time more or less than then the estimated time required to bring the building to the set-back temperature, an error message is generated in step 213 by control element 103 and printed on terminal 104. This warning message indicates that the actual operation of the adaptive environment system did not match the expected operation. Maintenance personnel can thereby be alerted that there is some disparity between the estimated performance of this environment control system, which includes the control elements 102 through 105 as well as HVAC system 101 and the building 110 itself. In the case where the time differential measured in step 212 is within limits, control element 103 passes control back to step 201 where variable predictor 102 determines estimates of the variables K and γ. Variable predictor 102 and control element 103 continue to cycle through steps 201 through 208 once the building is operating under the set-back conditions, and elements 102 and 103 use the new set-back temperature to control the level of activity of HVAC system 101.

TRANSFER TO SET-POINT OPERATION

An analogous operation takes place in steps 209 through 213 for the set-point operation. In this case, control element 103 stimulates HVAC system 101 to a high level of activity to increase thermal transfer Q of HVAC system 101 so that the building proceeds from the set-back temperature to the set-point temperature for an occupied building. This switch in the control mode takes place at step 210. In step 211, control element measures the time actually required to bring the building to the set-point temperature and compares, at step 212, the actual time required with the estimated time required to bring the building to the set-point temperature. As before with the set-back temperature, control element 103 determines whether this time differential is within a set of pre-defined limits. At step 212, if the actual time does not correspond to a reasonable degree with the estimated time, an error message is printed out at step 213 on terminal 104. If the actual measured time is sufficiently close to the estimated time required to bring the building to the set-point temperature, at step 212, control element 103 returns to step 201 to proceed through steps 201 through 208 with the normal control of HVAC system 101.

NORMAL HVAC CYCLE

At step 206, control element 103 calculates the time t required to bring the building interior temperature to the set-point/back temperature, based on the measured interior temperature of building 110 and the estimates of the variables. At step 207, control element 103 calculates the interior temperature of building 110 from the present time to a time t in the future. Control element, at step 208, determines whether this predicted temperature deviates from the set-point/back temperature by greater than a predetermined amount. If it does not, control element 103 returns to step 201. If it does, control element 103 advances to step 210 to activate HVAC system 101 to bring the building interior temperature to the set-point/back temperature, as described above.

Steps 206–208 represent a building-dependent mode of controlling HVAC system 101. Simple thermostats wait until the actual building interior temperature deviates from the set-point/back temperature by amount than a predetermined amount before activating the HVAC system. It takes a certain amount of time before the HVAC system can have an impact on the building interior temperature. In the meantime, the interior temperature of the building deviates from the set-point/back temperature even more than the predetermined amount. Control element 103, in steps 206–208, anticipates when this threshold is reached and activates HVAC system 101 in advance of the building interior temperature deviating from the set-point/back temperature by the predetermined amount. Thus, HVAC system 101 is running by the time this threshold is reached, and the building interior temperature does not deviate from the set-point/back temperature by more than the predetermined amount. Control element 103 performs this control function on the basis of the building's thermal characteristics, outside weather conditions, and HVAC system thermal properties.

This description of FIG. 1 illustrates in general terms the operational steps taken by the adaptive environment control system to regulate the operation of HVAC system 101 to provide optimal start/stop function, as well as a maintenance function to monitor the operational efficiency of HVAC system 101. The comparison steps 203 and 212 are provided to indicate to the maintenance personnel any significant deviation from the expected thermal characteristics of the thermal system comprising building 110, HVAC system 101, and the adpative environment control system elements 102–105.

In this fashion, maintenance personnel can obtain an advanced warning of any degradation of performance of HVAC system 101, or any significant change in thermal characteristics M and L which are associated with building 110.

The following software routines illustrate exemplary implementations of the various functions illustrated in FIG. 2. These routines are written in "pseudo-code" in a form similar to the C programming language with the addition of English phrases to encompass significant pieces of code. In addition, it is important to note that variables may need to be implemented as function calls and that the "pseudo-code" is composed of real-time concurrent processes. Any of a number of variable predictors can be used, and a Kalman Predictor is disclosed herein. This predictor is self-starting, self-resetting, and requires little memory to compute.

INITIALIZATION ROUTINE

The following routine initializes the various parameters and variables used throughout the system:

```
init( ) {                                              (12)

γ̂ <— 60;

k̂ <— 0.0001;

σ²_{γ,w} <— σ²_{k,w} <— 0.4;

σ²_{γ,v} <— σ²_{k,v} <— 0.02;

p_γ <— p_k <— 5; /*large p forces large Kalman gain,b*/

Σ R <— 0;

T_{occupied} <— 70;

T_{unoccupied} <— 58;

t_{start} <— 7:30;

t_{stop} <— 16:00;

number of days system has run <— 0;
}
```

SET POINT TEMPERATURE DETERMINATION

This process determines the correct set point temperature for the building, based on impending occupancy or unoccupancy and the forecast of the model. The state of the buildings' occupancy (unoccupied or not) is assumed to be a function of the time of day.

```
set_point_temp( ) {                                    (13)

WHILE (set_point ≠ T_{occupied}) { sleep (1_minute);

t <— (T_{occupied} — T) / (T_{out} + γ — T) / k;

IF (t ≤ t_{start} — current_time)

set_point <— T_{occupied};

measure ('γ');

}
  }

WHILE (set_point ≠ T_{unoccupied}) { sleep (1_minute);

t <— (T_{unoccupied} — T) / (T_{out} — T) / k;

IF (t ≤ t_{stop} — current_time)

set_point <— T_{unoccupied};

measure ('k');

}
  }
}
```

DETERMINE ESTIMATORS FOR γ AND K

This routine determines values for γ and k based on how long the building took to heat up or cool down, respectively, and on environmental conditions.

```
measure(parm) {                                        (14)

t <— 0; /*time to reach setpoint*/

T_o <— T; /*temperature at transition*/

WHILE (parm = 'γ' && T < T_{occupied} || parm = 'k' T > T_{unoccupied}) { sleep (1_second);

++t;

}

IF (parm = 'γ') {

γ <— T_o — T_{out} — (T_o — T) / k / t;

predict(γ);

IF (system has run ≤ 10 days) /*save data compute μ_γ, σ²_{γ,w}, and σ²_{γ,v}

γ[n] · γ <— γ;

γ[n] · T_{out} <— T_{out};

γ[n] · T <— T;
```

γ[n] · t <− t;

}

}

ELSE IF(parm = 'k') { k <− (T − T$_o$) / (T$_{out}$ − T$_o$) / t;

predict(k);

IF (system has run ≦ 10 days) { k[n] <− k;

IF (system has run 10 days) { compute μ$_k$, σ$^2_{k,w}$, and σ$^2_{k,v}$ using store values of k;

k <− μ$_k$; /*initialize predictor to sample mean*/

R$_{k,max}$ <− 2*σ$_{k,v}$;

ΣR$_{k\ max}$ <− 4*σ$_{k,v}$;

FOR(i <− 1; i ≦ 10; ++i)

predict(k[i]);

compute μ$_γ$, σ$^2_{γ,w}$, and σ$^2_{γ,v}$ using stored values of γ;

γ <− μ$_γ$; /*initialize predictor*/

R$_γ$,max <− 2*σ$_{γ,v}$;

ΣR$_{γ\ max}$ <− 4*σ$_{γ,v}$;

FOR (i <− 1; i ≦ 10; ++i)

predict(γ[n] · T$_o$ − γ[n] · T$_{out}$ − (γ[n] · T$_o$ − γ[n] · T) / k / t);

}

}

}

ELSE error: invalid parameter;

}

DETERMINE THE KALMAN PREDICTOR OF γ OR K

The following schematic of the Kalman Predictor routine is simplified. In actuality, the variables used (R, ρ, b, σ$_w^2$, σ$_v^2$, etc.)     (15)

are a function of σ or k. I.e., R, for example, should really be R$_γ$ or R$_k$, according to whether the formal parameter x is γ or k, respectively.

predict(x) {     (16)

R <− x − x;

IF (system has run > 0 days) /*use ρ$_o$ the first run after initialization*/

ρ <− (1 − b)*ρ + σ$_w^2$;

b <− ρ / (ρ + σ$_v^2$);

-continued x <− x + b*R;

IF(system has run > 10 days) {

ΣR <− ΣR + R;

IF(R > R$_{max}$ ||| ΣR > | ΣR$_{max}$ | {

CASE(x) {

'k': console_msg(suspect building envelope failure);

'γ': console_msg(suspect HVAC equipment failure);

}

IF(|ΣR > |ΣR$_{max}$| {

ΣR <− 0;

ρ <− 5; /*force large Kalman gain*/ number of days system has run <− 0;

}

}
        }
    }

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. An adaptive environment control system for dynamically modifying operation of an HVAC system to control interior temperature of a building as a function of thermal properties of the building, comprising:
    means for repeatedly determining the interior temperature and temperature outside of said building;
    means connected to said determining means for repeatedly estimating, from said determined temperatures, values of said thermal properties;
    means connected to said estimating means and responsive to said estimated values of said thermal properties for controlling the operation of said HVAC system based on said estimated values to bring the interior temperature of said building to a pre-set temperature at a predetermined time;
    means connected to said estimating means for repeatedly predicting future values of said thermal properties from said estimated values; and
    means connected to said estimating means and said predicting means for generating an alarm indication if values predicted for a given time differ from values estimated for said given time by more than a predetermined amount.

2. The system of claim 1 further comprising: means for measuring performance characteristics of said HVAC system; and
    wherein said estimating means is connected to said measuring means and responsive to said measured performance characteristics for revising said estimated values of said thermal properties.

3. The system of claims 1 or 2 wherein said controlling means includes: p1 means connected to said estimating means and said determining means and responsive to said estimated values of said thermal properties and said determined interior temperature for calculating a period of time required for said HVAC system to bring said building interior temperature to said pre-set temperature; and
    means connected to said calculating means and responsive to the calculated time period for initiating the operation of said HVAC system at said required time period prior to said predetermined time to bring the interior temperature of said building to said pre-set temperature at said predetermined time.

4. The system of claim 2 wherein the controlling means includes:
    means connected to said measuring means and responsive to said measured performance characteristics for generating an alarm indication when said measured performance characteristics deviate from nominal performance characteristics by more than a predetermined amount.

5. The system of claim 3 wherein said controlling means further includes:
    means for predicting the interior temperature of said building for a length of time equal to said time period required to bring said interior temperature to said pre-set temperature; and
    means connected to said predicting means and responsive to said predicted temperature for activating said HVAC system if said predicted temperature deviates from said pre-set temperature by more than a predefined amount.

6. The system of claims 1 or 2 wherein said generating means includes:
    means connected to said estimating means and responsive to said estimated values of said thermal properties for generating an alarm indication when said estimated values of said thermal properties of said building deviate from nominal values of said thermal properties of said building by more than a predetermined amount.

7. The system of claim 1 wherein said estimating means includes:
    means for obtaining measurements of an environment of said building; and
    means connected to said obtaining means and responsive to said measurements for estimating said values of said thermal properties of said building.

8. The system of claim 7 wherein said estimating means includes:
    means connected to said obtaining means and responsive to said measurements for estimating parameters indicative of ratios of said values of said thermal properties of said building.

9. The system of claim 7 further comprising:
    means for comparing said estimated values of said properties against predefined limits; and
    means connected to said comparing means for resetting said estimated values of said thermal properties to nominal values of said thermal properties within said predefined limits when said estimated values of said thermal properties exceed said predefined limits.

10. The system of claim 1 wherein the generating means comprises:
    means for generating an alarm indication if a sum of differences between predicted and estimated values for different given times exceeds a predetermined amount.

11. The system of claim 1 wherein:
    said thermal properties represent time-rate-of-change of heat gain or loss of thermal mass of said building, rate of heat transfer of said building to a surrounding environment, and thermal input to said building provided by said HVAC system.

12. The system of claim 11 wherein the means for estimating the values of the thermal properties comprise:
    means for estimating from said determined temperatures a ratio of (a) said thermal input to said building by said HVAC system and (b) said rate of heat transfer of said building to said surrounding environment multiplied by a difference of said determined interior and outside temperatures; and
    means for estimating from said determined temperatures a ratio of (a) said rate of heat transfer of building to said surrounding environment multiplied by said difference of said determined interior and outside temperatures and (b) said time-rate-of-change of heat gain or loss of said thermal mass of said building multiplied by a rate-of-change of said determined interior temperature.

13. An adaptive environment control system for controlling operation of an HVAC system to bring interior temperature of a building to a pre-set temperature, comprising:
   means for storing a set of building characteristic data;
   means for repeatedly determining the interior temperature and temperature outside of said building;
   means connected to said storing means and to said temperature-determining means and responsive to said building characteristic data and said determined temperatures for repeatedly estimating values of thermal properties of said building;
   means connected to said estimating means and responsive to said estimated thermal properties for controlling the operation of said HVAC system based on said estimated thermal properties to bring the interior temperature of said building to said pre-set temperature at a predetermined time;
   means connected to said estimating means for repeatedly predicting future values of said thermal properties from said estimated values; and
   means connected to said estimating means and said predicting means for generating an alarm indication if values predicted for a given time differ from values estimated for said given time by more than a predetermined amount.

14. The system of claim 13 further comprising:
   means for measuring performance characteristics of said HVAC system; and
   means connected to said measuring means and said storing means and responsive to said measured performance characteristics for updating said building characteristic data in said storing means.

15. The system of claims 13 or 14 wherein said controlling means includes:
   means connected to said estimating means and said determining means and responsive to said estimated values of said thermal properties and said determined interior temperature for calculating a period of time required for said HVAC system to bring said building interior temperature to said pre-set temperature; and
   means connected to said calculating means and responsive to the calculated time period for initiating the operation of said HVAC system at said required time period prior to said predetermined time to bring the interior temperature of said building to said pre-set temperature at said predetermined time.

16. The system of claim 15 wherein said controlling means further includes:
   means for predicting the interior temperature of said building for a length of time equal to said time period required to bring said interior temperature to said pre-set temperature; and
   means connected to said predicting means and responsive to said predicted temperature for activating said HVAC system when said predicted temperature deviates from said pre-set temperature by a predefined amount.

17. The system of claim 14 wherein said controlling means includes:
   means connected to said measuring means and responsive to said measured performance characteristics for generating an alarm indication when said measured performance characteristics deviate from nominal performance characteristics by more than a predetermined amount.

18. The system of claim 14 wherein said generating means includes:
   means connected to said measuring means and responsive to said estimated values of said thermal properties for generating an alarm indication when said estimated values of said thermal properties deviate from nominal values of said thermal properties by more than a predetermined amount.

19. The system of claim 13 wherein the generating means comprises:
   means for generating an alarm indication if a sum of differences between predicted and estimated values for different given times exceeds a predetermined amount.

20. The system of claim 13 wherein:
   said thermal properties represent time-rate-of-change of heat gain or loss of thermal mass of said building; rate of heat transfer of said building to a surrounding environment, and thermal input to said building provided by said HVAC system.

21. The system of claim 20 wherein the means for estimating the values of the thermal properties comprise:
   means for estimating from said determined temperatures a ratio of (a) said thermal input to said building provided by said HVAC system and (b) said rate of heat transfer of said building to said surrounding environment multiplied by a difference of said determined interior and outside temperatures; and
   means for estimating from said determined temperatures a ratio of (a) said rate of heat transfer of said building to said surrounding environment multiplied by said difference of said determined interior and outside temperatures and (b) said time-rate-of-change of heat gain or loss of said thermal mass of said building multiplied by a rate-of-change of said determined interior temperature.

22. A method of controlling operation of an HVAC system to regulate interior temperature of a building as a function of thermal properties of the building, comprising the steps of:
   repeatedly determining the interior temperature and temperature outside of said building;
   repeatedly estimating, from said determined temperatures, values of said thermal properties;
   controlling the operation of said HVAC system using estimated thermal properties to bring the interior temperature of said building to said pre-set temperature at a predetermined time; repeatedly predicting future values of said thermal properties from said estimated values; and
   generating an alarm indication if values predicted for a given time differ from values estimated for said given time by more than a predetermined amount.

23. The method of claim 22 further including the steps of:
   measuring performance characteristics of said HVAC system; and
   revising said estimated values of said thermal properties on a basis of said measured performance characteristics.

24. The method of claims 22 or 23 wherein the step of controlling includes the steps of:
   calculating a period of time required for said HVAC system to bring said building interior temperature to said pre-set temperature; and
   effecting the operation of said HVAC system at said required time period prior to said predetermined time to bring the interior temperature of said building to said pre-set temperature at said predetermined time.

25. The method of claim 24 wherein said step of controlling further includes the steps of:
   predicting the interior temperature of said building for a length of time equal to said time period required to bring said interior temperature to said pre-set temperature; and
   activating said HVAC system if said predicted temperature deviates from said pre-set temperature by more than a predetermined amount.

26. The method of claim 23 wherein said step of generating includes the steps of:
   generating an alarm indication when said measured performance characteristics deviate from nominal performance characteristics by more than a predetermined amount.

27. The method of claims 22 or 23 wherein the step of generating includes the step of:
   generating an alarm indication when said estimated values of said thermal properties deviate from nominal values of said thermal properties by more than a predetermined amount.

28. The method of claim 22 wherein said step of estimating includes the steps of:
   obtaining measurements of an environment of said building; and
   estimating said values of said thermal properties of said building based on said obtained measurements.

29. The method of claim 28 wherein said step of estimating includes the step of:
   estimating parameters indicative of ratios of said values of said thermal properties of said building.

30. The method of claim 28 further comprising the steps of:
   comparing said estimated values of said thermal properties against predefined limits; and
   resetting said estimated values of said thermal properties to nominal values of said thermal properties within said predefined limits when said estimated values of said thermal properties exceed said predefined limits.

31. The method of claim 23 wherein the step of generating comprises the step of:
   generating an alarm indication if a sum of differences between predicted and estimated values for different given times exceeds a predetermined amount.

32. The method of claim 22 wherein the step of repeatedly estimating comprises the step of:
   estimating values of said thermal properties representing time-rate-of-change of heat gain or loss of thermal mass of said building, rate of heat transfer of said building to a surrounding environment, and thermal input to said building provided by said HVAC system.

33. The method of claim 32 wherein the step of estimating comprises the steps of:
   estimating from said determined temperatures a ratio of (a) said thermal input to said building provided by said HVAC system and (b) said rate of heat transfer of said building to said surrounding environment multiplied by a difference of said determined interior and outside temperatures; and
   estimating from said determined temperatures a ratio of (a) said rate of heat transfer of said building to said surrounding environment multiplied by said difference of said determined interior and outside temperatures and (b) said time-rate-of-change of heat gain or loss of said thermal mass of said building multiplied by a rate-of-change of said determined interior temperature.

34. A method of controlling operation of an HVAC system to bring interior temperature of a building to a pre-set temperature, comprising the steps of:
   storing a set of building characteristic data;
   repeatedly determining the interior temperature and temperature outside of said building;
   repeatedly estimating values of thermal performance properties of said building using said building characteristic data and said determined temperatures;
   controlling the operation of said HVAC system using said thermal performance properties to bring the interior temperature of said building to said pre-set temperature at a predetermined time;
   repeatedly predicting future values of said thermal properties from said estimated values; and
   generating an alarm indication if values predicted for a given time differ from values estimated for said given time by more than a predetermined amount.

35. The method of claim 34 including the steps of:
   measuring operational characteristics of said HVAC system;
   calculating a new set of building characteristic data from said measured operational characteristics; and
   updating said stored set of building characteristic data using said new set of building characteristic data.

36. The method of claims 34 or 35 wherein the step of controlling includes the steps of:
   calculating a period of time required for said HVAC system to bring said building interior temperature to said pre-set temperature; and
   initiating the operation of said HVAC system at said required time period prior to said determined time to bring the interior temperature of said building to said pre-set temperature at said predetermined time.

37. The method of claims 34 or 35 wherein the step of generating further includes the step of:
   generating an alarm indication when said estimated values of said thermal properties deviate from nominal values of said thermal properties by more than a predetermined amount.

38. The method of claim 36 wherein the step of controlling includes the steps of:
   predicting the interior temperature of said building for a length of time equal to said time period required to bring said interior temperature to said pre-set temperature; and
   activating said HVAC system when said predicted temperature deviates from said pre-set temperature by more than a predetermined amount.

39. The method of claim 35 wherein the step of generating further includes the step of:
   generating an alarm indication when said measured operational characteristics deviate from nominal operational characteristics by more than a predetermined amount.

40. The method of claim 34 wherein the step of generating comprises the step of:

generating an alarm indication if a sum of differences between predicted and estimated values for different given times exceeds a predetermined amount.

41. The method of claim 34 wherein the step of repeatedly estimating comprises the step of:

estimating values of thermal performance properties representing time-rate-of-change of heat gain or loss of thermal mass of said building, rate of heat transfer of said building to a surrounding environment, and thermal input to said building provided by said HVAC system.

42. The method of claim 41 wherein the step of estimating comprises the steps of:

estimating from said determined temperatures a ratio of (a) said thermal input to said building provided by said HVAC system and (b) said rate of heat transfer of said building to said surrounding environment multiplied by a difference of said determined interior and outside temperatures; and estimating from said determined temperatures a ratio of (a) said rate of heat transfer of said building to said surrounding environment multiplied by said difference of said determined interior and outside temperatures and (b) said time-rate-of-change of heat gain or loss of said thermal mass of said building multiplied by a rate-of-change of said determined interior temperature.

43. A method of controlling operation of a building HVAC system comprising the iteratively-performed steps of:

storing a set of building characteristic data;

determining temperature inside of said building;

determining temperature outside of said building;

estimating values of thermal performance properties of said building using said building characteristic data and said determined inside and outside temperatures;

controlling the operation of said HVAC system using said thermal performance properties to bring the interior temperature of said building to a pre-set temperature at a predetermined time;

measuring operational characteristics of said HVAC system;

calculating a new set of building characteristic data from said measured operational characteristics for storage in place of the previously-stored set of building characteristic data;

predicting future values of said thermal performance properties from said estimated values; and generating an alarm indication if values predicted for a given time differ from values estimated for said given time by more than a predetermined amount.

44. The method of claim 43 wherein the step of generating comprises the step of:

generating an alarm indication if a sum of differences between predicted and estimated values for different given times exceeds a predetermined amount.

45. The method of claim 43 wherein the step of estimating comprises the step of:

estimating values of thermal performance properties representing time-rate-of-change of heat gain or loss of thermal mass of said building, rate of heat transfer of said building to a surrounding environment, and thermal input to said building provided by said HVAC system.

46. The method of claim 45 wherein the step of estimating comprises the steps of:

estimating from said determined temperatures a ratio of (a) said thermal input to said building provided by said HVAC system and (b) said rate of heat transfer of said building to said surrounding environment multiplied by a difference of said determined interior and outside temperatures; and estimating from said determined temperatures a ratio of (a) said rate of heat transfer of said building to said surrounding environment multiplied by said difference of said determined interior and outside temperatures and (b) said time-rate-of-change of heat gain or loss of said thermal mass of said building multiplied by a rate-of-change of said determined interior temperature.

* * * * *